United States Patent
Han et al.

(10) Patent No.: US 7,116,518 B2
(45) Date of Patent: Oct. 3, 2006

(54) SHORT YOKE LENGTH PLANAR WRITER WITH LOW DC COIL RESISTANCE

(75) Inventors: Cherng Chyi Han, San Jose, CA (US); Mao-Min Chen, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 573 days.

(21) Appl. No.: 10/633,105

(22) Filed: Aug. 1, 2003

(65) Prior Publication Data

US 2005/0024769 A1     Feb. 3, 2005

(51) Int. Cl.
    *G11B 5/147* (2006.01)
(52) U.S. Cl. .................................... 360/126
(58) Field of Classification Search .............. None
    See application file for complete search history.

(56) References Cited

U.S. PATENT DOCUMENTS

| | | | |
|---|---|---|---|
| 6,204,997 B1 | 3/2001 | Sasaki | 360/123 |
| 6,337,783 B1 | 1/2002 | Santini | 360/317 |
| 6,339,523 B1 | 1/2002 | Santini | 360/317 |
| 6,466,401 B1 | 10/2002 | Hong et al. | 360/123 |
| 6,483,664 B1 | 11/2002 | Kamijima | 360/126 |

*Primary Examiner*—A. J. Heinz
*Assistant Examiner*—Mark Blouin
(74) *Attorney, Agent, or Firm*—Saile Ackerman LLC; Stephen B. Ackerman

(57) ABSTRACT

Present processes used for planarizing a cavity filled with a coil and hard baked photoresist require that a significant amount of the thickness of the coils be removed. This increases the DC resistance of the coil. In the present invention a layer of alumina is deposited onto the surface of the excess photoresist, following which CMP is initiated. The presence of the alumina serves to stabilize the photoresist so that it does not delaminate. CMP is terminated as soon as the coils are exposed, allowing their full thickness to be retained and resulting in minimum DC resistance. Application of this process to the manufacture of a two coil planar magnetic write head is described.

30 Claims, 6 Drawing Sheets

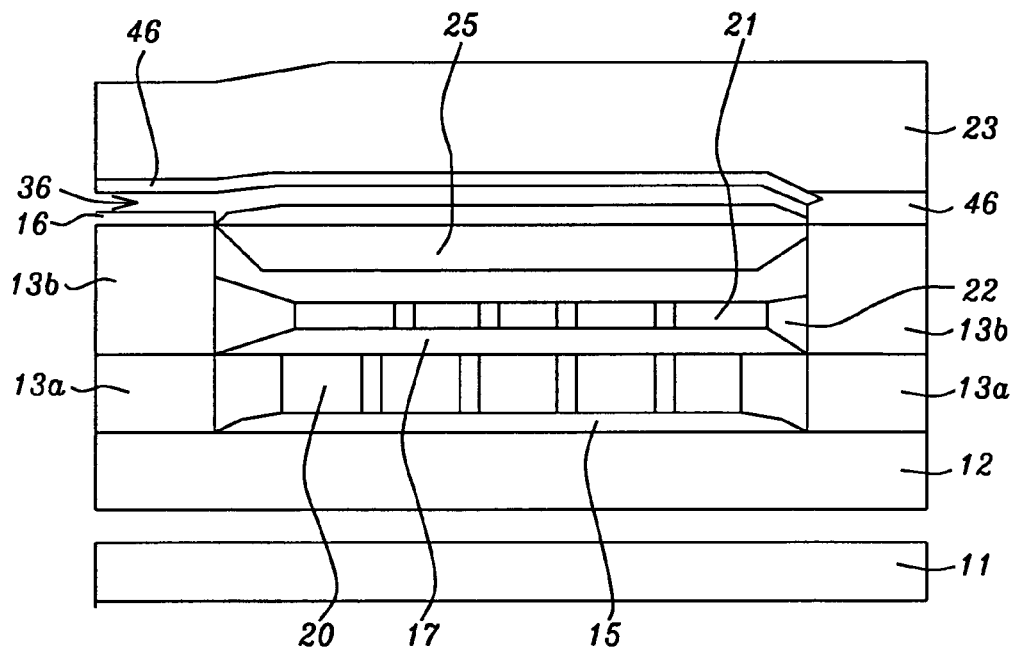
FIG. 1 – Prior Art
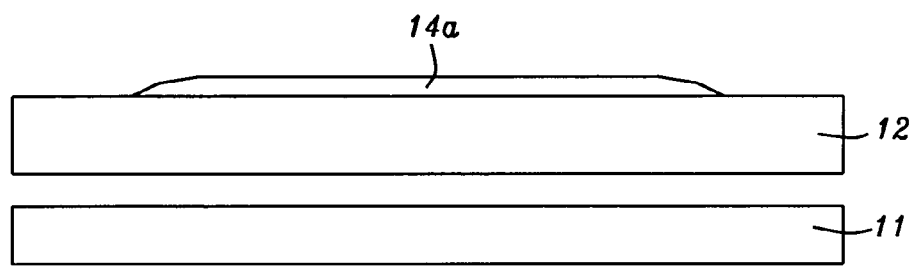
FIG. 2
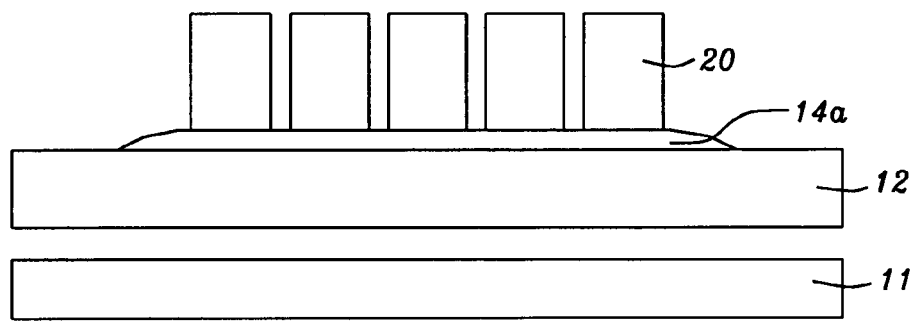
FIG. 3

SHORT YOKE LENGTH PLANAR WRITER WITH LOW DC COIL RESISTANCE

FIELD OF THE INVENTION

The invention relates to the general field of magnetic disks with particular reference to write heads for very narrow tracks.

BACKGROUND OF THE INVENTION

For high data rate writer application, one of the requirements is to have fast saturation and low inductance to induce short rise time. On the other hand, a low fly height for high areal density recording beyond 60 GB is needed in order to have better head performance. Many reliability problems are, however, associated with this low fly height. Problems such as thermal pole tip protrusion induced by thermal mismatch between alumina and pole materials during the writing process will create a head-disk interface problem and eventually will damage the read head. One of the solutions to reducing thermal pole tip protrusion is to reduce DC coil resistance of the writer so that less heat is generated during the writing process. Additionally, lower DC coil resistance improves the coil's thermal reliability.

FIG. 1 is a schematic cross-section through a typical stitched writer design having two coil layers. Seen in FIG. 1 are GMR read head 10, read head lower shield 11, read head upper shield 12, write head bottom pole 13 (P1), lower coil insulation 14. seed layers 15 and 17, write gap 16, stitched top pole 19, lower coil 20, upper coil 21, upper coil insulation 22, top pole 23, coil lead 24, and alumina layer 25

The main drawback of this 2 layer coil stitched writer structure is its high DC coil resistance. This is a result of the prior art processes used for its manufacture. In particular, because of the small size and internal spacings of the coils, the preferred material for enclosing and electrically isolating the coils has been hard baked photoresist. This material is well suited to filling in tiny openings and is soft enough to accommodate volume changes in the coils due to thermal expansion while they are operating at maximum power. Present processes used for planarizing a cavity filled with a coil and hard baked photoresist require that a significant amount of the thickness of the coils be removed. This, in turn, increases the DC resistance of a given coil having a given number of turns leading to a degradation of its performance.

In this invention, we describe a novel two layer coil structure with low DC coil resistance for short yoke length stitched writer.

A routine search of the prior art was performed with the following references of interest being found:

In U.S. Pat. Nos. 6,339,523 and 6,337,783 Santini describes a double coil pole tip design. In U.S. Pat. No. 6,483,664 Thomas et al disclose a write head with four coil layers. U.S. Pat. No. 6,466,401 (Hong et al.) teaches forming a second coil between the turns of a first coil and in U.S. Pat. No. 6,204,997 Sasaki shows a plurality of thin film coil layers.

SUMMARY OF THE INVENTION

It has been an object of at least one embodiment of the present invention to provide a magnetic write head.

Another object of at least one embodiment of the present invention has been that said write head be driven by a write coil having a DC resistance less than about 3 ohms for a minimum of 7 turns.

Still another object of at least one embodiment of the present invention has been to provide a process for manufacturing said coil and write head.

These objects have been achieved by using a modified CMP process for forming and encapsulating the write coil. After formation of the coil on the floor of a suitable cavity, the cavity and coil are overfilled with photoresist which is then hard baked. A layer of alumina is then deposited onto the surface of the excess photoresist, following which CMP is initiated. The presence of the alumina serves to stabilize the photoresist so that it does not delaminate. CMP is terminated as soon as the coils are exposed, allowing their full thickness to be retained, resulting in minimum DC resistance. Application of this process to the manufacture of a planar magnetic write head is described.

BRIEF DESCRIPTION OF THE DRAWINGS

FIG. 1 is a cross-sectional view of a two level planar write head of the prior art showing how the thickness of the lower coil is limited.

FIG. 2 shows the starting point for the process of the present invention.

FIG. 3 illustrates formation of the lower coil.

DESCRIPTION OF THE PREFERRED EMBODIMENTS

We will now describe a process to manufacture a two coil planar magnetic read head in which the coil DCR (DC resistance) is reduced relative to similar designs described in the prior art.

Referring now to FIG. 2, the process of the present invention begins with the provision of lower magnetic shield layer 12 (most commonly a top shield of a magnetic read head) and forming thereon disc 14a of dielectric material. Then, as illustrated in FIG. 3, lower copper coil 20 is formed on disc 14a. Coil 20 has at least 4 turns and a DC resistance that is less than about 2 ohms.

The copper coil is formed by depositing a conductive seed layer (not shown) after which the location and shape for the coil are determined by means of a photoresist pattern. This is followed by the electroplating copper onto all portions of the seed not covered by photoresist to a thickness between about 1.5 and 2.5 microns. All photoresist is then stripped away and all areas of the seed layer that are not covered by copper are removed.

Figure 4:
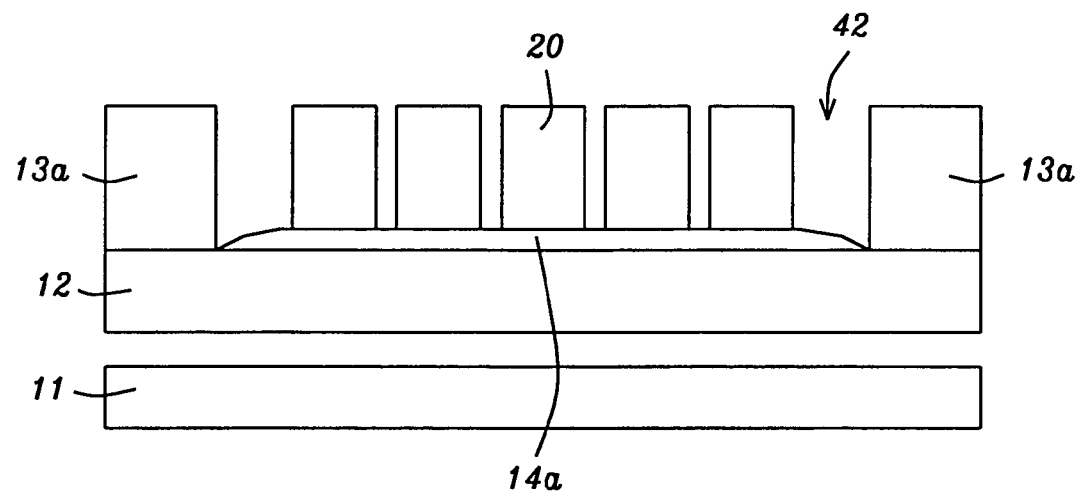
FIGS. 4–6 show the sub-process used for encapsulating and planarizing the lower coil.
Figure 5:
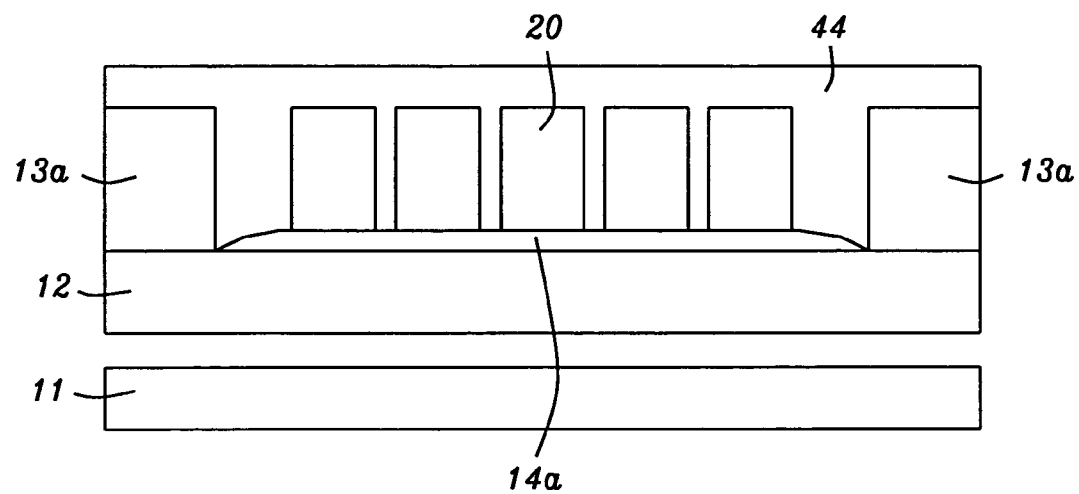
Figure 6:
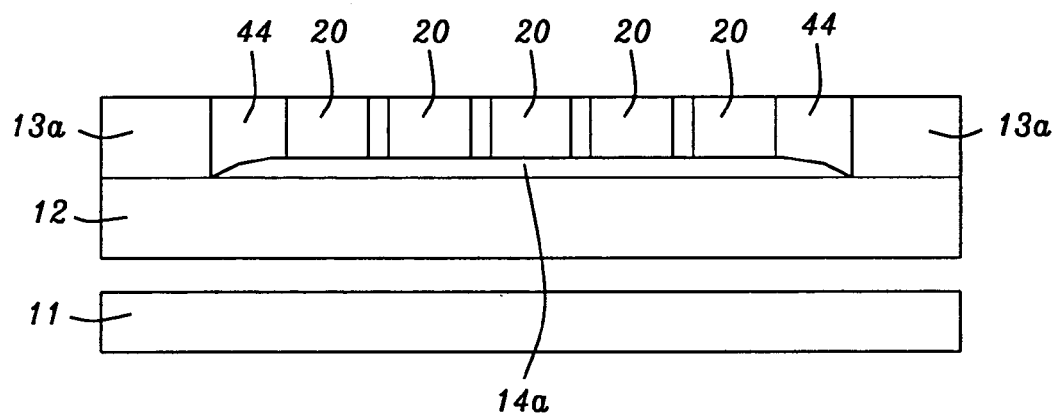

Referring now to FIG. 4, layer 13a of ferromagnetic materia is deposited and then patterned to form bottom section 13a of the lower pole, including centrally located lower trench 42 (depth between about 2 and 4 microns). Layer 13a is typically Co, CoNiFe, or NiFe and it is usually deposited to a thickness between about 3 and 4 microns. Trench 42 is then overfilled with layer 44 of insulating material (FIG. 5) and then planarized down to the level of trench 42 (FIG. 6).

Figure 7:
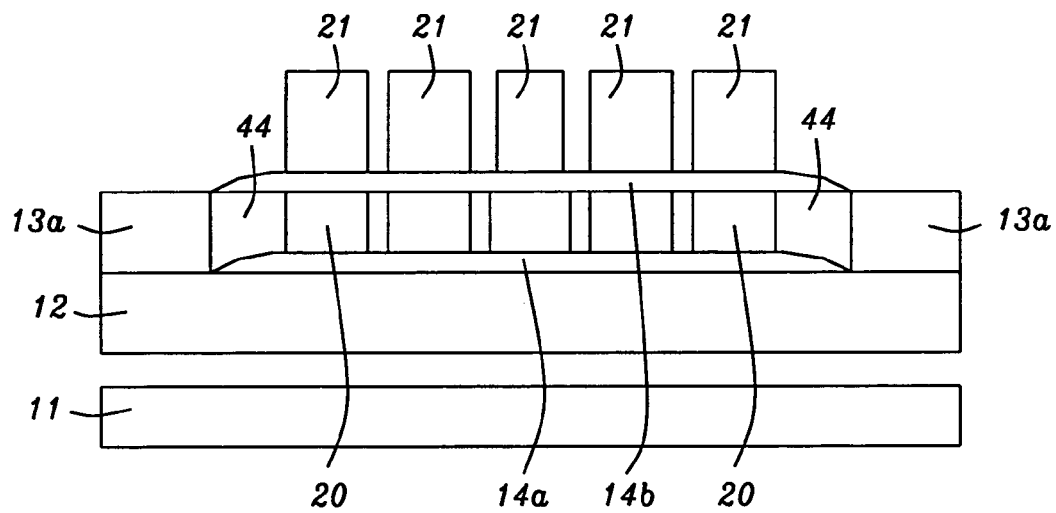
FIGS. 7–8 illustrate the sub-process for forming and encapsulating the upper coil.

Next, as shown in FIG. 7, insulating lid 14b, that fully covers lower coil 20 as well as trench 42 is formed, following which upper copper coil 21 is formed on it. Coil 21 has at least 3 turns and a DC resistance that is less than about 1.5 ohms.

Figure 8:
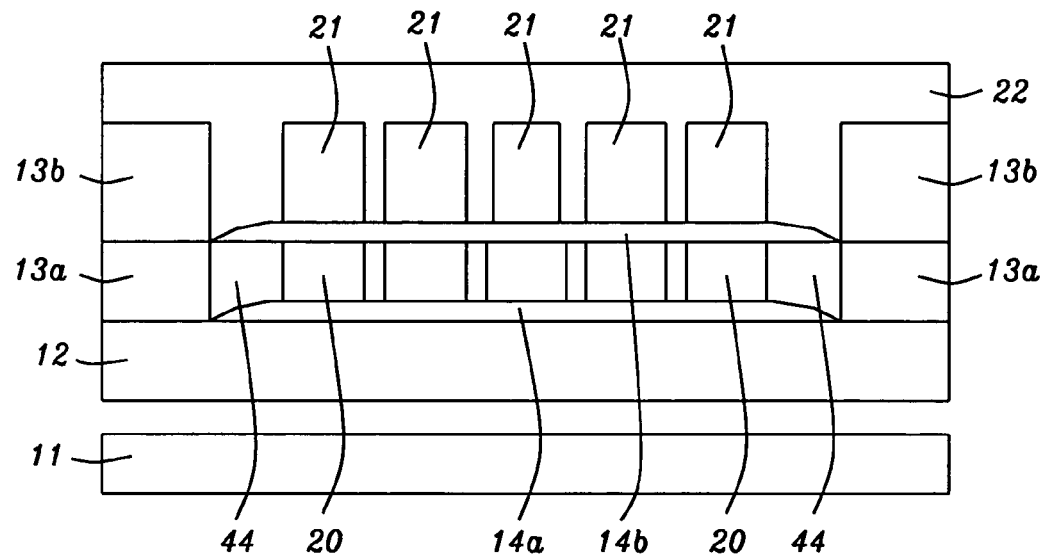

Referring next to FIG. 8, second layer of ferromagnetic material 13b is deposited and patterned to complete formation of the lower pole, including an inner trench similar to trench 42 (see FIG. 4) on whose floor rest lid 14a and upper copper coil 21. Layer of baked photoresist 22 is now deposited to a thickness sufficient to cover upper coil 21 and to extend at least 1 micron above the top surface of lower pole 13a/b.

Figure 9:
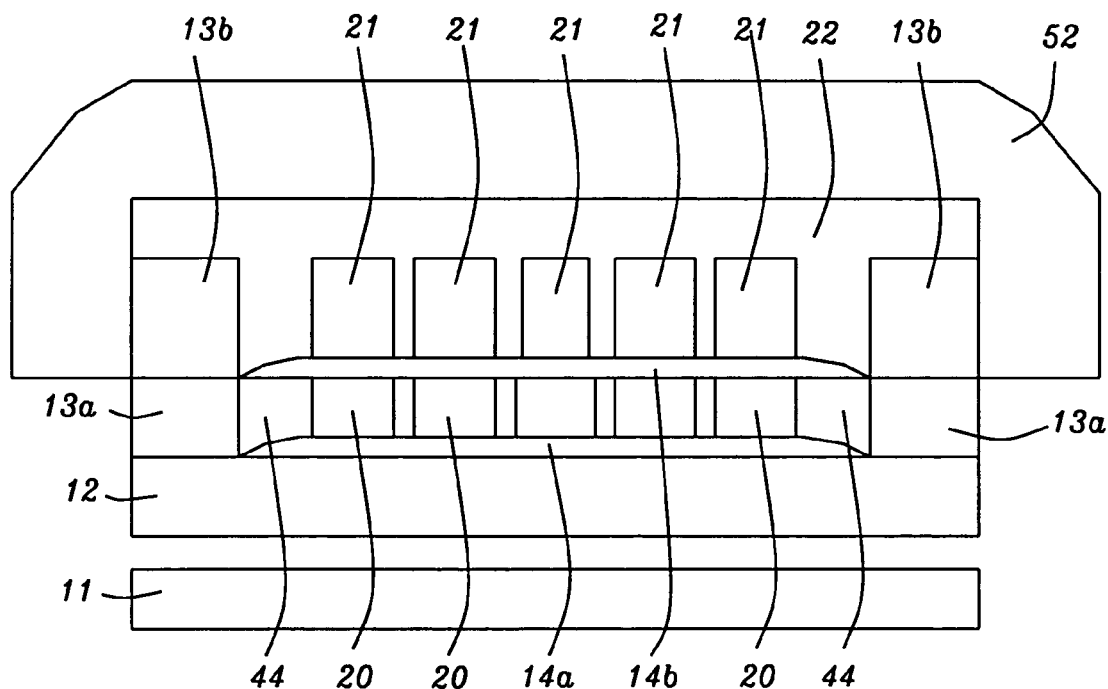
FIGS. 9–10 schematically show the novel process used to planarize the upper coil without delamination of the baked photoresist used to achieve encapsulation of the coil.
Figure 10:
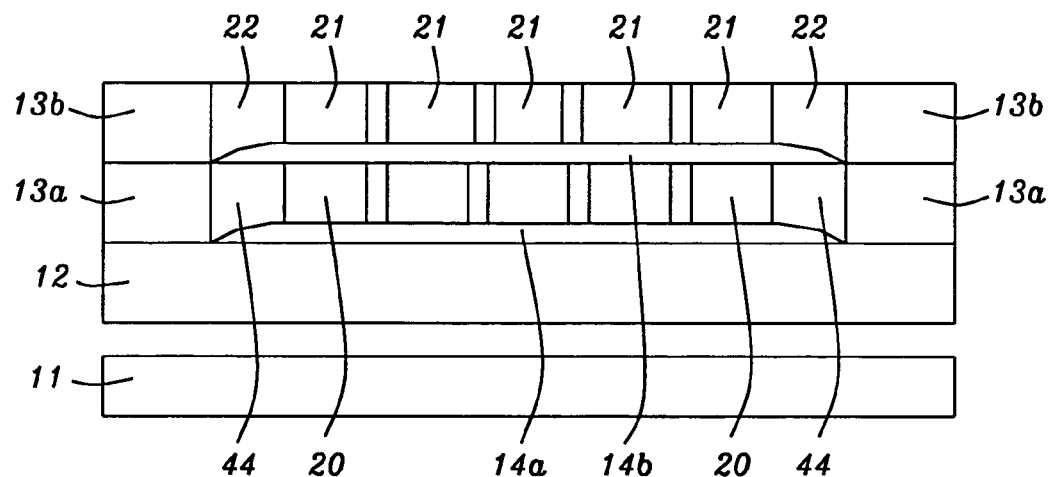

Now follows a key feature of the invention. As illustrated in FIG. 9, layer 22 of baked photoresist and all exposed portions of the lower pole are covering with alumina layer 52 (to a thickness between about 4 and 5.5 microns), following which the structure is planarized by CMP leading to the removal of layer 52 as well as the excess baked photoresist 22 so that upper copper coil 21 and the lower pole are just exposed. This is seen in FIG. 10.

Figure 11:
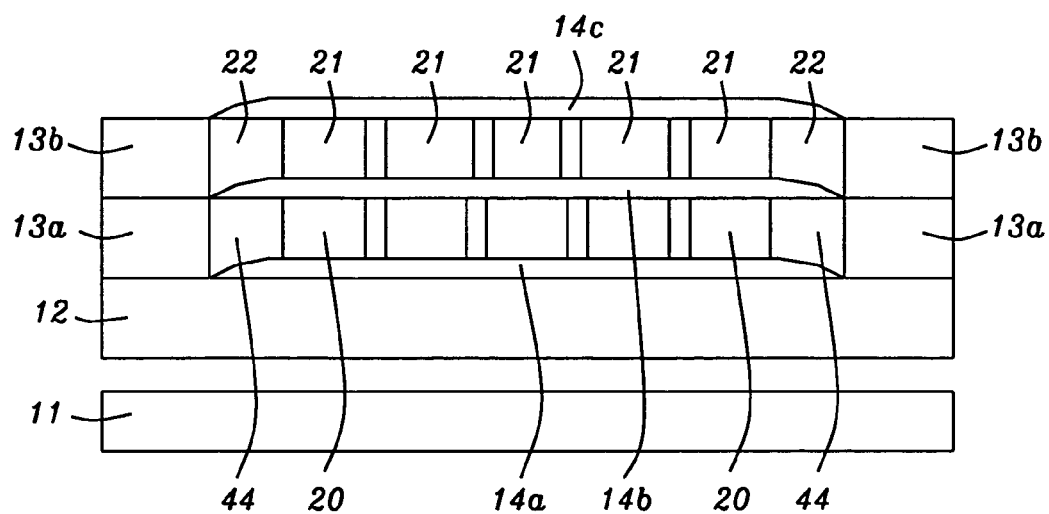
FIGS. 11–12 show the covering of the upper coil together with formation of a lower high permeability layer.
Figure 12:
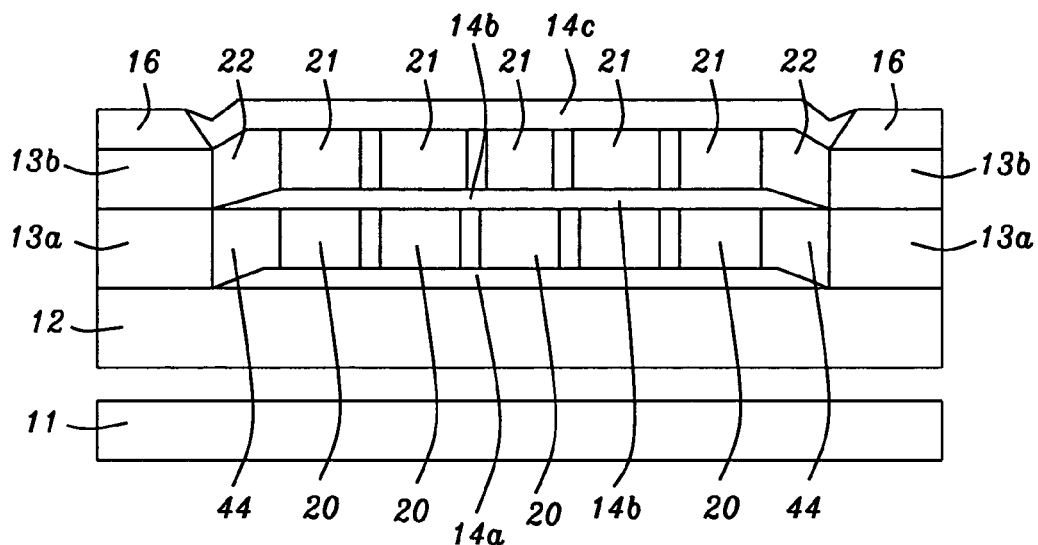

As seen in FIG. 11, second insulating lid 14c is now formed so that it fully covers upper coil 21 as well as the trench in which it sits. This is followed by the deposition and patterning of high permeability layer 16 onto lower pole 13a/b, as shown in FIG. 12. Preferred materials for high permeability layer 16 include CoFeN and it is deposited to a thickness between about 0.15 and 0.4 microns.

Figure 13:
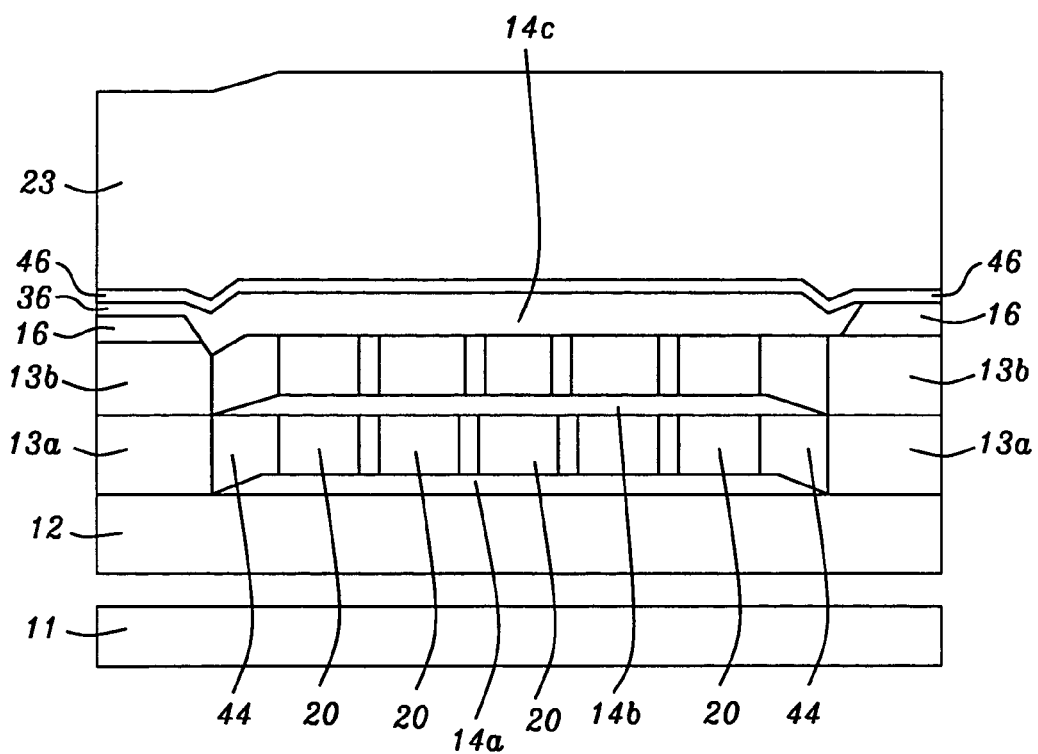
FIG. 13 shows the completed device including a write gap and an upper high permeability layer.

Referring next to FIG. 13, formation of the structure is concluded by the formation of the non-magnetic write gap layer 36 (which is present on the lower pole only the side nearest the air bearing surface which is to the left in FIG. 13). This is followed by the formation of second layer of high permeability material 46 that contacts write gap 36 as well as the bottom pole. Layer 46 is CoFeN or CoFe and it is deposited to a thickness between about 0.15 and 4 microns. Finally, top pole 23 is formed on layer 23 of high permeability material and the process is complete.

What is claimed is:

1. A planarizing process comprising:
providing a first layer of a material having an upper surface,
etching in said first layer a cavity having a floor;
forming on said cavity floor a copper coil, having at least 4 turns and a DC resistance that is less than about 2 ohms;
applying a layer of photoresist to a thickness that is more than sufficient to cover said lower coil;
hard baking said layer of photoresist and then planarizing so that between about 1 and 2.5 microns of remaining hard baked photoresist extends above said upper surface;
coating said layer of baked photoresist with a layer of alumina; and
planarizing by means of chemical mechanical polishing until said coil is just exposed and no photoresist remains on said upper surface.

2. The process recited in claim 1 wherein said cavity has a depth between about 2 and 4 microns.

3. The process recited in claim 1 wherein said cavity has a width between about 0.5 and 1 microns and a length between about 4 and 10 microns.

4. The process recited in claim 1 wherein the step of forming a copper coil further comprises:
depositing a conductive seed layer;
defining a location and shape for said coil by means of a photoresist pattern and then electroplating copper to a thickness between about 1.5 and 2.5 microns onto all areas not covered by said photoresist;
stripping away all photoresist; and
then removing all areas of the seed layer that are not covered by copper.

5. The process recited in claim 1 wherein the step of applying a layer of photoresist further comprises use of spin coating.

6. The process recited in claim 1 wherein the step of hard baking said layer of photoresist further comprises baking for 1 to 5 hours at a temperature between about 150 and 250° C. in vacuum or nitrogen.

7. The process recited in claim 1 wherein said layer of alumina is deposited to a thickness between about 5 and 6 microns.

8. The process recited in claim 1 wherein said layer of alumina is deposited by means of RF sputtering.

9. A process to manufacture a planar magnetic write head, having upper and lower poles and an air bearing surface, comprising:
providing a lower magnetic shield layer;
forming a disc of dielectric material on said lower magnetic shield a layer;
forming, on said disc, a lower copper coil having at least 4 turns and a DC resistance that is less than about 2 ohms;
depositing and then patterning a first layer of ferromagnetic material to form a bottom section of the lower pole, having a top surface, that includes a centrally located lower trench on whose floor rest said dielectric disc and lower copper coil;
overfilling said lower trench with a first layer of insulating material and then planarizing so that said filled trench has an upper surface that is coplanar with the upper surface of said lower pole bottom section;
depositing, and then patterning, a second insulating layer to form a first lid that fully covers said lower coil and said lower trench;
forming, on said first lid, an upper copper coil, having at least 4 turns and a DC resistance that is less than about 2 ohms;
depositing and then patterning a second layer of ferromagnetic material thereby completing formation of the lower pole, including its top surface and a centrally located upper trench on whose floor rest said first lid and said upper copper coil;
depositing a layer of baked photoresist to a thickness that is sufficient to cover said upper coil and to extend at least 1 micron above the top surface of the lower pole;
then covering said layer of baked photoresist and all exposed portions of said lower pole with a layer of alumina;
then, by means of chemical mechanical polishing, planarizing until said upper copper coil and said lower pole are just exposed;
depositing, and then patterning, a third insulating layer to form a second lid that fully covers said upper coil and said upper trench;
depositing and then patterning a first layer of high permeability material on said lower pole;
then depositing and patterning a layer of non-magnetic material to coat said first layer of high permeability material only between said upper trench and said air bearing surface thereby forming a write gap;
depositing a second layer of high permeability material that contacts said write gap, said second lid, and said bottom pole; and then forming a top pole on said second layer of high permeability material.

10. The process recited in claim 9 wherein said magnetic shield layer is a top shield of a magnetic read head.

11. The process recited in claim 9 wherein said bottom section of said lower pole is CoFe, CoNiFe, or NiFe.

12. The process recited in claim 9 wherein said bottom section of said lower pole is deposited to a thickness between about 1 and 1.5 microns.

13. The process recited in claim 9 wherein said first high permeability layer is CoFeN.

14. The process recited in claim 9 wherein said first high permeability layer is deposited to a thickness between about 0.15 and 0.4 microns.

15. The process recited in claim 9 wherein said lower trench has a depth between about 2 and 4 microns.

16. The process recited in claim 9 wherein said second high permeability layer is CoFeN.

17. The process recited in claim 9 wherein said second high permeability layer is deposited to a thickness between about 0.15 and 4 microns.

18. The process recited in claim 9 wherein said upper trench has a depth between about 2 and 4 microns.

19. The process recited in claim 9 wherein the step of forming said lower copper coil further comprises:
   depositing a conductive seed layer;
   defining a location and shape for said coil by means of a photoresist pattern and then electroplating copper to a thickness between about 1.5 and 2.5 microns onto all areas not covered by said photoresist;
   stripping away all photoresist; and
   then removing all areas of the seed layer that are not covered by copper.

20. The process recited in claim 9 wherein said layer of alumina is deposited to a thickness between about 5 and 6 microns.

21. A planar magnetic write head, having an air bearing surface, comprising:
   a lower magnetic shield layer;
   a disc of dielectric material on said lower magnetic shield layer;
   on said lower magnetic shield layer, a lower magnetic pole that surrounds said disc;
   on said disc, a lower copper coil having at least 4 turns and a DC resistance that is less than about 2 ohms;
   a first layer of insulating material that encapsulates said lower coil up as far as said coil's upper surface;
   a second insulating layer in the form of a first lid that fully covers said lower coil and extends therefrom as far as said lower pole;
   on said first lid, an upper copper coil having at least 3 turns and a DC resistance that is less than about 1.5 ohms;
   a layer of baked photoresist that encapsulates said upper coil up as far as said coil's upper surface;
   a third insulating layer in the form of a second lid that fully covers said upper coil and extends therefrom as far as said lower pole;
   a first layer of high permeability material on said lower pole;
   a layer of non-magnetic material coating said first layer of high permeability material only between said upper trench and said air bearing surface whereby it is a write gap;
   a second layer of high permeability material that contacts said write gap, said second lid, and said bottom pole; and
   a top pole on said second layer of high permeability material.

22. The write head described in claim 21 wherein said lower magnetic shield layer is a top shield of a magnetic read head.

23. The write head described in claim 21 wherein said bottom pole is CoFe, CoNiFe, or NiFe.

24. The write head described in claim 21 wherein said bottom pole has a thickness between about 1 and 1.5 microns.

25. The write head described in claim 21 wherein said high permeability layers are CoFeN.

26. The write head described in claim 21 wherein said first high permeability layer has a thickness between about 0.15 and 4 microns.

27. The write head described in claim 21 wherein first layer of insulating material is alumina.

28. The write head described in claim 21 wherein said second high permeability layer has a thickness between about 0.15 and 4 microns.

29. The write head described in claim 21 wherein said layer of non-magnetic material that forms the write gap is ruthenium or alumina.

30. The write head described in claim 21 wherein said layer of non-magnetic material that forms the write gap has a thickness between about 0.08 and 0.15 microns.

* * * * *